June 4, 1940. B. B. SMITH Re. 21,478

AIRCRAFT

Original Filed Sept. 26, 1933 2 Sheets-Sheet 1

Inventor
Beauford B. Smith

By
James D. Gunnau
Attorney

June 4, 1940. B. B. SMITH Re. 21,478
AIRCRAFT
Original Filed Sept. 26, 1933 2 Sheets-Sheet 2
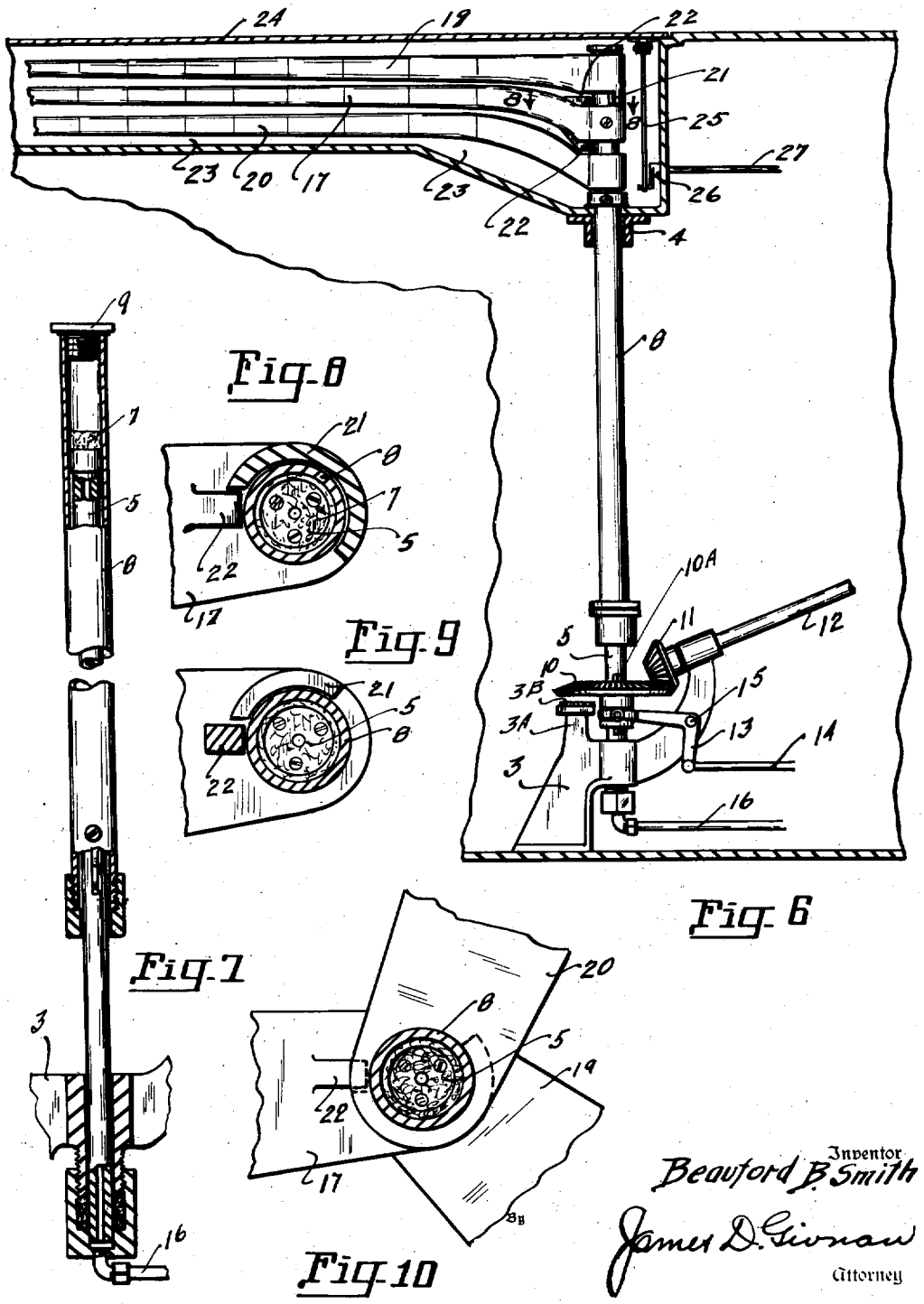
Inventor
Beauford B. Smith
James D. Gionau
Attorney Reissued June 4, 1940

Re. 21,478

UNITED STATES PATENT OFFICE 21,478

AIRCRAFT

Beauford B. Smith, San Diego, Calif., assignor to Edward F. Andrews, Chicago, Ill.

Original No. 2,008,843, dated July 23, 1935, Serial No. 690,979, September 26, 1933. Application for reissue July 16, 1937, Serial No. 153,950

16 Claims. (Cl. 244—6)

This invention relates to improvements in aircraft and more especially to the autogyro type of aircraft wherein a plurality of rotating airfoils are used to create lifting power for vertical and forward flight of the aircraft.

One of the principal objects of the invention is to provide a mechanism of this character whereby the craft will have a high flying speed and a low landing speed.

Another object of the invention is the provision of a gyro mechanism of this character wherein the said airfoils are mounted to a common drive shaft to which they are partially independently rotatably mounted and whereby the shaft engages the blades progressively one after another and automatically arranges them in equi-distant angular relationship to each other and also whereby said airfoils will automatically release themselves for automatically positioning into a position of rest.

Another object of the invention is to provide a means whereby said airfoils are collapsible to a position of rest wherein they are arranged one upon the other and in such position adapted to be housed within the streamline confines of the aircraft body, thereby offering no parasite resistance whatever to the forward flight of the aircraft.

Another object of the invention is the provision of automatic means for projecting the airfoils from a position of rest within the fuselage of the aircraft to an operative position above the aircraft. By this same means the airfoils may be readily retracted into an inoperative position and housed within the fuselage. In other words, for the take-off of the aircraft, to which my invention is applied, it is merely necessary for the pilot to operate a control within the cockpit of the ship for releasing the airfoils into operative position, whereupon they are caused to rotate by a mechanical means hereinafter described, to create maximum lifting power for causing a rapid ascension of the aircraft.

Upon reaching a predetermined altitude the pilot of the aircraft may then retract the airfoils as aforesaid within the fuselage of the ship and then the relatively small wings of the aircraft are alone used for straightaway flight. By this arrangement it is obvious that, due to the small wing area, my improved type of aircraft is capable of a high rate of flying speed and a low rate of descent or landing speed.

These and other objects will appear as my invention is more fully hereinafter described in the following specification, illustrated in the accompanying drawings and finally pointed out in the appended claims.

In the drawings

Fig. 6 is an enlarged detailed view of the driving mechanism for the airfoils themselves in inoperative position.

Fig. 7 is an enlarged detailed view of a pneumatic means for projecting and retracting said airfoils with respect to the fuselage of the aircraft.

Fig. 8 is an enlarged fragmentary sectional plan view, taken on the line 8—8 of Figure 6.

Fig. 9 is a similar view taken on the line 9—9 of Figure 6.

Fig. 10 is an enlarged fragmentary plan view taken on the line 10—10 of Figure 4.

Figure 4:
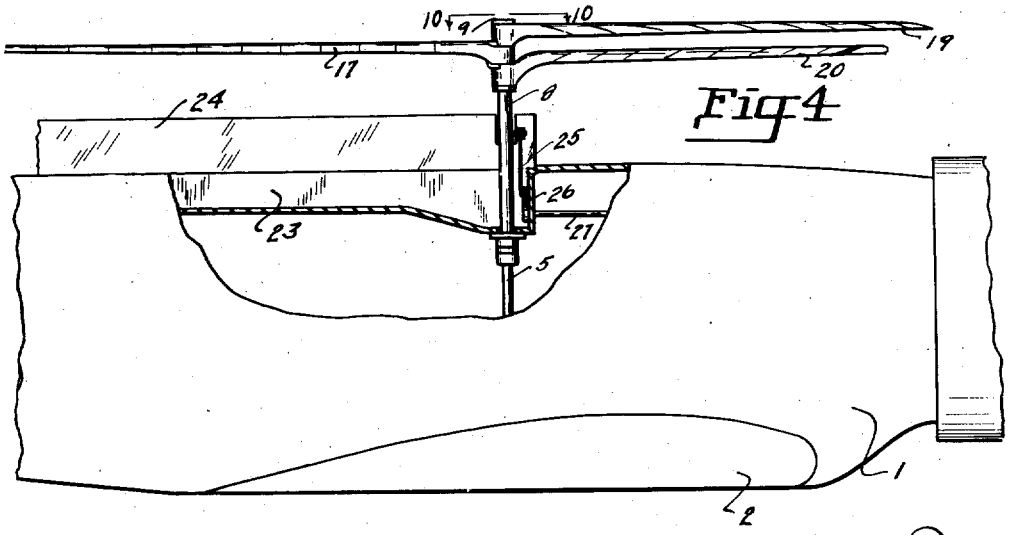
Fig. 4 is an enlarged fragmentary sectional side elevation of Figure 1, taken on line 4—4 of Figure 1, and with parts broken away for convenience of illustration.
Figure 1:
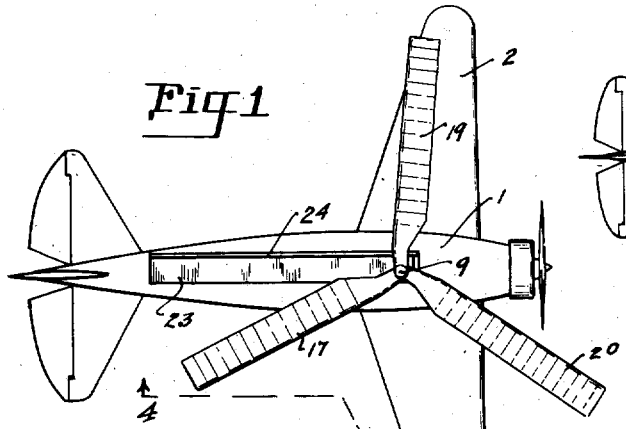
Fig. 1 is a top plan view of my improved type of aircraft showing my new and improved autogyro mechanism in operative engagement therewith.
Figure 2:
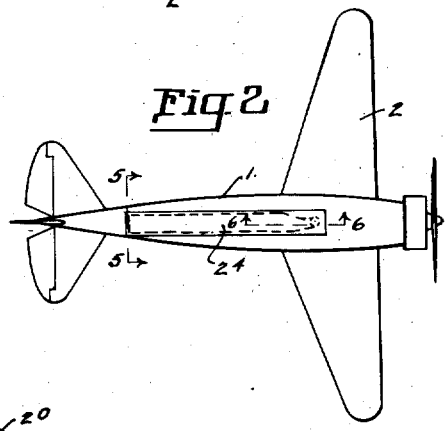
Fig. 2 is a top plan view of an aircraft showing the airfoils of my autogyro collapsed and housed within the fuselage of the aircraft.
Figure 3:
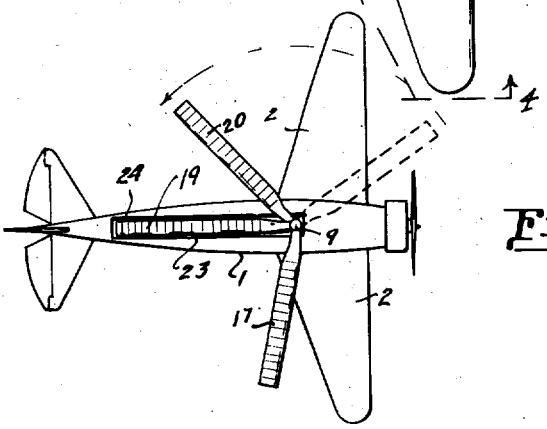
Fig. 3 is a view similar to Figures 1 and 2 and showing the airfoils in the process of assuming their inoperative positions for subsequent housing within the fuselage of the aircraft.
Figure 5:
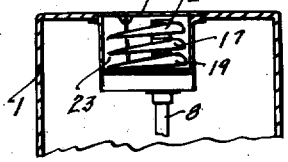
Fig. 5 is an enlarged fragmentary sectional view, taken on the line 5—5 of Figure 2.

Referring now more particularly to the drawings:

Reference numeral 1 indicates the main body or fuselage of an aircraft having wings 2 extending outwardly from the side thereof in the usual manner. 3 and 4 indicate bearings securely mounted within the fuselage to rotatably support a hollow shaft 5. The shaft 5 is longitudinally bored as at 6 and provided at its uppermost end with a felt or leather piston 7 or any other approved form of piston. Surrounding the shaft 5 and slidably mounted thereon is a tubular housing 8 which extends upwardly beyond the bearing 4. The uppermost end of the housing 8 is provided with a cap 9 which contains a lubricating oil reservoir packed with felt or the like, which renders the same air-tight between the top or the shaft 5 and its inner and uppermost end. The housing 8 is rotatable with the shaft 5 through the medium of any suitable key mechanism but the housing is slidable vertically with respect to the shaft 5 by reason of an elongated key-way to permit of moving the housing 8 longitudinally of the shaft during rotation of the shaft 5. To the shaft 5, I secure a bevel gear 10 coacting with a driving pinion 11 which is secured to a drive shaft 12 whose opposite end is in operative engagement with the engine of the aircraft. Associated with the bevel gear 10 is a bell crank 13 which is operable by means of an actuating rod 14 by means of which the gear 10 may be disengaged from the pinion 11 by rocking the bell crank around its pivot point 15.

The lowermost end of the longitudinally bored shaft 5 is connected by any suitable means to a pressure line 16 through which suitable pressure or suction may be directed through the shaft 5 and into the upper end of the housing 8 for projecting or retracting the same with respect to said shaft 5. Upon the upper end of the housing 8, I secure an airfoil 17 by any suitable means such for instance as a pin 18 whereby said airfoil is rotatable with said housing at all times. Above and below said anchored airfoil, I provide companion airfoils 19 and 20 which are rotatably mounted to the shaft through a predetermined degree of rotation but are provided with limit stops 21 for abutment with corresponding limit stops 22 formed on the central and anchored airfoil so that as said central airfoil rotates with the shaft in one direction, it will progressively pick up the companion airfoils 19 and 20 and likewise upon rotation in the opposite direction it will progressively release said airfoils so that they may be swung by the slipstream or air incidental of flight around and over the body of the aircraft. Within the upper wall of the fuselage of the aircraft I provide a cavity 23 to form a housing, as aforesaid, and the airfoils when they are in a position of rest are arranged one upon the other. The uppermost end of the cavity is provided with any suitable closure plate 24 shaped to correspond with the contour of the aircraft body and hinged thereto along one of its edges by any suitable means. For convenience in opening and closing said closure plate I provide a link 25 connected at one of its ends to the underside of the closure plate 24 and at its opposite end to a crank arm 26 to which is secured an actuating rod 27 which extends to a point within convenient reach of the pilot of the aircraft so that manipulation of the rod 27 will cause the closure plate to rapidly open to permit emergence of said airfoils. This closure controlling mechanism, as aforesaid, is not sufficiently strong to overcome the projecting of the airfoils through the closure in the case of a forced landing or the like, where, sudden application of pressure applied to the housing 8 will instantly project said housing and said airfoils up through the top of the cavity and in so doing swing the closure open against any resistance by the said controlling mechanism. As a modified form of closure fastening means I may provide a catch controllable from the cockpit and which may be swung out of locking engagement with the closure. I have not here shown this modified form of fastening means since I am aware that any approved form of such fastening means may be employed.

In connection with the bevel gear 10, it is to be noted that the gear is slidably mounted upon the shaft 5 by means of a key 10A, and operable with respect to the pinion 11 by means of the bell crank 13, as aforesaid.

Upon the bearing support 3 I form an upwardly extending projection 3A formed at its upper end with a brake shoe 3B arranged in the path of downward movement of the bevel gear 10, so that a prolonged pull on the rod 14 and bell crank 13 will cause the gear to wipe against the brake shoe to effect a braking action thereupon.

While I have shown a particular form of embodiment of my invention I am aware that many minor changes therein will readily suggest themselves to those skilled in the art without departing from the spirit and scope of the invention.

Having thus described the invention, what I claim as new and desire to protect by Letters Patent is:

1. An aircraft of the class described, comprising a fuselage, wings, an empennage and a power plant, a vertical shaft rotatably mounted within the fuselage and engageable with the power plant, a housing slidably mounted upon said shaft and rotatable therewith, said housing adapted to be projected from the interior of the fuselage to the exterior thereof, a plurality of airfoils mounted upon the housing and adapted to be projected or retracted with said housing from the interior of the fuselage to the exterior thereof, one of said airfoils being secured to the housing and the others being rotatably mounted upon the housing and means formed on said other of said airfoils for becoming progressively engaged with the said secured airfoil.

2. An aircraft as in claim 1 including a cavity formed in the fuselage for receiving said airfoils when in retracted position.

3. In an aircraft having a fuselage, wings and an empennage, the combination of a plurality of individual radially directed airfoils mounted upon a drive shaft, means operable by the rotation of said shaft for arranging said airfoils in substantially equally spaced position, and means for retracting said airfoils in their rearward collapsed position to a position of rest within the fuselage in the direction of its length.

4. In an aircraft having a fuselage, wings and an empennage, the combination of a vertically disposed power driven shaft, a housing slidably and rotatably mounted upon said shaft and adapted to be driven thereby, means for projecting said housing above said fuselage and for retracting the housing to a position within the fuselage, an airfoil secured at one of its ends to said housing, a plurality of companion airfoils partially rotatably mounted upon said housing, cooperative limit stops formed on said first mentioned airfoil and on the companion airfoils for abutment with each other upon rotation of said housing to thereby spread said airfoils into angular positions with respect to each other.

5. In an aircraft having a fuselage, motor means driving a horizontal propeller, a fixed wing adapted to support the aircraft during flight when driven by said propeller, a rotating wing system mounted on the forward portion of said fuselage comprising a rotatable member and a plurality of independently movable generally radial airfoils mounted thereon, means connecting said member to the motor means, clutch means whereby the pilot may drive said member, brake means for said member, means carried by said member and operative when the member is driven for substantially equally spacing said airfoils, said airfoils being free to be moved rearwardly by the airstream into substantially parallel relation when said clutch means are disconnected by the pilot during flight.

6. In an aircraft having a fuselage, motor means driving a horizontal propeller, a fixed wing adapted to support the aircraft during flight when driven by said propeller, a rotating wing system comprising a rotatable member and a plurality of independently movable generally radial airfoils mounted thereon, disengageable means connecting said member to the motor means whereby the pilot may drive said member, means carried by said member and operative when the member is driven for substantially equally spacing said airfoils, said airfoils being free to be moved rearwardly by the airstream into substantially parallel relation when said disengageable means is disengaged, by the pilot during flight, means for projecting and retracting said member with said airfoils in rearward parallel position during flight, and means for opening and closing the top surface of said fuselage to permit the passage of said airfoils therethrough.

7. An aircraft having a fuselage, a motor, stationary wings adapted to support the aircraft during high speed flight, a system of rotating wings mounted on the forward portion of the fuselage comprising a telescopic shaft and a plurality of independent generally radial airfoils mounted on the upper end of said shaft, means connecting said shaft to said motor whereby the wing system may be rotated, means carried by said shaft for spacing said airfoils when the shaft is driven, means for freeing said airfoils to cause them to be moved rearwardly by the airstream to a position substantially parallel to the fuselage comprising clutch means controllable by the pilot during flight.

8. In an aircraft having a fuselage, motor means driving a horizontal propeller, a fixed wing driven by said propeller adapted to support the aircraft during flight, a rotating wing mounted on the forward portion of said fuselage comprising a rotatable member carrying a radially disposed airfoil, disengageable means connecting said member to said motor means whereby the pilot may rotate said airfoil, said airfoil being free to be moved rearwardly by the airstream to a position in which the entire rotating wing is directed rearwardly and substantially parallel to the major axis of said fuselage when the disengageable means is disengaged by the pilot during flight, and means for projecting and retracting said rotating wing in said position toward and away from said fuselage.

9. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a blade carried by said member, and extending radially in a single direction from the member, means to arrest said blade in a rearwardly directed position over part of the fuselage, and means for moving said member axially and downwardly to bring said blade into compact relation with the fuselage.

10. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a blade carried by said member and extending radially in a single direction from the member, means to arrest said blade in a rearwardly directed position over part of the fuselage, means for moving said member axially and downwardly to bring said blade into compact relation with the fuselage, means for projecting said member, and means operatively connecting the member to the motor to drive said blade.

11. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a blade carried by said member and extending radially in a single direction from the member, said fuselage being provided with longitudinal housing means which extends rearwardly from said member, and means for moving said shaft axially and downwardly to bring said blade into said housing means.

12. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a blade carried by said member and extending radially in a single direction from the member, said fuselage being provided with longitudinal housing means which extends rearwardly from said member, means for moving said member axially and downwardly to bring said blade into said housing means, means for projecting said member axially and upwardly to elevate the blade out of said housing, and means for operatively connecting said member to said motor to effect driving of the blade.

13. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a plurality of blades carried by the member, each adapted to extend radially outwardly in a single direction from the member, means for locating said blades in different radial directions, means for arresting said blades and locating them in a rearward direction with their major axes parallel to the major axis of the fuselage and above the fuselage, and means for moving said member axially and downwardly to bring said blades into compact relation with the fuselage.

14. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a plurality of blades carried by the member, each adapted to extend radially outwardly in a single direction from the member, means for locating said blades in different radial directions, means for arresting said blades and locating them in a rearward direction with their major axes parallel to the major axis of the fuselage and above the fuselage, means for moving said member axially and downwardly to bring said blades into compact relation with the fuselage, means for projecting said member axially and upwardly to elevate said blades, and means operatively connecting the member to the motor to drive said blades.

15. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a plurality of blades carried by the member, each adapted to extend radially outwardly in a single direction from the member, means for locating said blades in different radial directions, said fuselage being provided with longitudinal housing means which extends rearwardly from said member, means for arresting said blades and locating them in a rearward direction with their major axes parallel to the major axis of the fuselage and above said housing means, and means for moving said member axially and downwardly to bring said blades into said housing means.

16. In an aircraft having a fuselage extending longitudinally in the airflow direction, motor means driving a horizontal propeller, a fixed wing on said fuselage adapted to support the aircraft during flight, a member adapted to be projected axially and upwardly above the fuselage, a plurality of blades carried by the member, each adapted to extend radially outwardly in a single direction from the member, means for locating said blades in different radial directions, said fuselage being provided with longitudinal housing means which extends rearwardly from said member, means for arresting said blades and locating them in a rearward direction with their major axes parallel to the major axis of the fuselage and above said housing means, means for moving said member axially and downwardly to bring said blades into said housing means, means for projecting said member axially and upwardly to elevate the blades out of said housing means, and means for operatively connecting said member to said motor to effect driving of the blades.

BEAUFORD B. SMITH.